E. J. VON HENKE.
ELECTRIC RIVETING.
APPLICATION FILED OCT. 28, 1918.

1,322,848.

Patented Nov. 25, 1919.

INVENTOR
Edmund J. von Henke
BY
Townsend & Decker
ATTORNEYS

UNITED STATES PATENT OFFICE.

EDMUND JANNEZ von HENKE, OF NEW YORK, N. Y., ASSIGNOR TO THOMSON ELECTRIC WELDING COMPANY, OF LYNN, MASSACHUSETTS, A CORPORATION OF MASSACHUSETTS.

ELECTRIC RIVETING.

1,322,848.                  Specification of Letters Patent.       Patented Nov. 25, 1919.

Application filed October 28, 1918. Serial No. 259,915.

*To all whom it may concern:*

Be it known that I, EDMUND J. VON HENKE, a citizen of the United States, and a resident of New York, in the county of New York and State of New York, have invented certain new and useful Improvements in Electric Riveting, of which the following is a specification.

My present invention relates to a process and apparatus for electrically riveting plates or sheets of metal, particularly heavy plates.

The object of the invention is to effect the setting up of the rivet in an efficient manner and to provide an effective union of great strength.

The invention consists in the improved process and apparatus for electrically riveting metal plates as hereinafter more particularly described and then specified in the claims.

In the accompanying drawings,—

Figure 1:
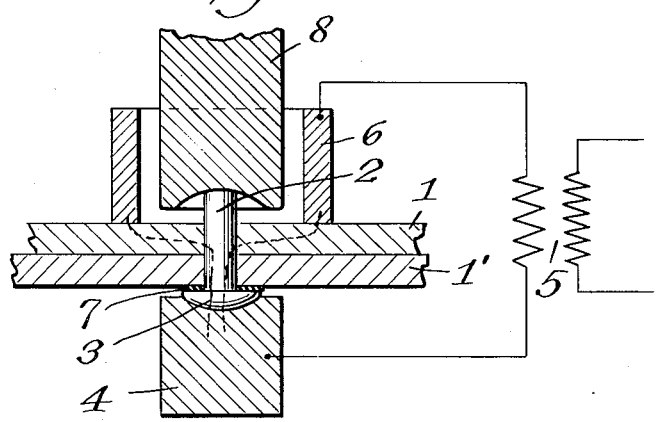

Figure 1 diagrammatically illustrates an arrangement by which the invention may be practised.

Figure 2:
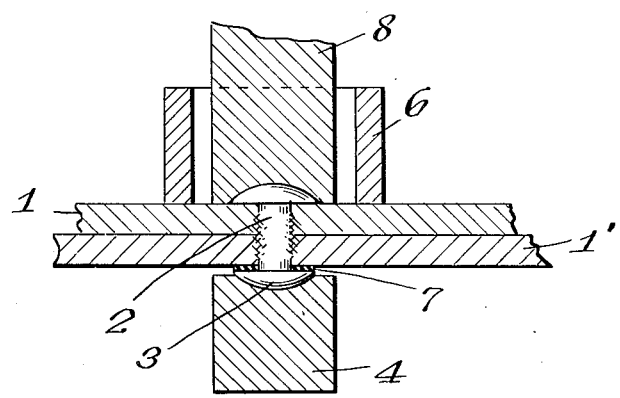

Fig. 2 is a similar view at the end of the riveting operation.

1, 1' indicate the two plates to be joined by the rivet 2. The rivet blank as initially provided preferably has a head 3 which has a bearing against the outer surface of one of the plates, the shank of the rivet passing through alined perforations in the plates and projecting from the plate 1.

4 indicates a current supplying block or contact forming one terminal of the secondary of an electric transformer 5 as is usual and well understood in the electric heating and welding art. The contact block 4 may also form a seat for the head 3 of the rivet but said block does not make direct contact with either of the plates 1, 1'.

6 indicates the coöperating contact block preferably of annular form and electrically connected with the secondary of the transformer 5 to form the other terminal thereof. The block 6 contacts with the plate 1 around and at a short distance from the rivet blank 2. If desired the block 6 may be bifurcated or of any other suitable form.

As the rivet blank 2 is inserted cold it can be given a tight fit within the perforations in the plates 1, 1' so that when the circuit is established, current will flow from the contact block 6 across the joint between the rivet shank 2 and the walls of the perforations and through the rivet shank and head to the contact block 4 as indicated in dotted lines in Fig. 1. To insure that the current will not shoot direct across the plates from one electrode to the other but will be compelled to follow the path first described, an insulating washer 7 may be inserted between the head 3 and plate 1'.

As the current continues to flow, the rivet will become heated first at that part which is located within the perforations and the walls of the perforations will also become heated and softened. As the flow of current continues the heat from the shank will be conducted outward to the projecting rivet end and when said end becomes sufficiently softened, upsetting pressure is applied thereto by means of the heading die 8.

The said heading die is actuated in any desired manner and as it is brought down the pressure expands the heated shank of the rivet outwardly causing it to commingle with the softened walls of the perforations resulting in a welded union between the plates and shank, at the same time heading over the end of the rivet against the plate 1.

By compelling the current to flow in the path described, the heating of the projecting rivet end is held back and is always of lower temperature than the shank located within the perforations. This permits the shank and the walls of the perforations to rise to a welding temperature without unnecessarily heating the end to be headed as it is not necessary that this end should reach a welding temperature to be upset. Also by holding back the heating of the rivet end a greater pressure can be transmitted to the shank to effect the welding to the plates around the perforations.

The insulating washer 7 may be made of any suitable material and may be very thin and if desired may be of such material that the heat toward the end of the operation will cause it to become destroyed and allow the rivet head 3 to seat direct against the plate 1'.

As is usual in the art the contact blocks 4 and 6 are of copper or other good conducting material. As the heading die 8 does not carry any current it may be made of steel or other hard substance and thereby is not injured when great upsetting pressure is applied. This is a distinct advantage over those constructions of electric riveting apparatus in which one of the electrodes also forms the heading die which being of soft material becomes readily distorted and requires renewal. The present invention is also a distinct advantage over electric riveting devices and apparatus in which separate heating and heading dies are employed as in the present instance both the work and the heating and heading dies remain stationary during the cycle of operation:—that is, it is not necessary to shift the work into line with the heading die after heating nor is it necessary to bodily shift either the heating or the heading die to bring the heading die into operative position.

It will be understood that the invention is capable of being practised in various ways, and with various forms and arrangements of apparatus and that such modifications may be resorted to without departing from the spirit of the invention as set forth in the appended claims.

What I claim as my invention is:

1. The method of electric riveting consisting in inserting a rivet blank through perforations in the plates to be joined, passing an electric current in such manner that the shank of the rivet within the perforations becomes heated first and then heading the end of the rivet.

2. The method of electric riveting consisting in inserting a rivet blank through perforations in the plates to be joined, with one end of the rivet projecting therefrom, passing an electric current through the rivet in such manner that the part within the perforations becomes heated first and then heats the projecting rivet head by conduction and heading said projecting rivet end.

3. The method of electric riveting consisting in inserting a rivet blank through perforations in the plates to be joined, with one end of the rivet projecting therefrom, passing an electric current through the rivet in such manner that the heating of the exposed end is held back until the shank within the perforations has softened and applying pressure to the exposed rivet end to expand the rivet shank against the wall of the perforations and at the same time head the rivet.

4. The method of electric riveting consisting in inserting a rivet blank through perforations in the plates to be joined, with one end of the rivet projecting therefrom, passing a heating electric current into the rivet across the joint between the shank and the perforations whereby the shank within the perforations becomes heated before the exposed end and applying pressure to said end to head the rivet and weld the shank to the plates around the perforations.

5. The method of electric riveting consisting in inserting a rivet blank through perforations in the plates to be joined, with one end of the rivet projecting therefrom, passing a heating electric current into the rivet across the joint between the shank and the perforations and applying endwise pressure to the exposed end to head the same and effect a welding of the rivet shank to the plates within the perforations thereof.

6. The method of electric riveting consisting in inserting a headed rivet blank through perforations in the plates to be joined with one end projecting therefrom, assembling the same between current supplying contacts, one engaging the rivet head and the other engaging one of the plates at a distance from the rivet blank, passing an electric current from one contact to the other and applying upsetting pressure to the projecting rivet end by means of a separate heading die.

7. In an electric riveting apparatus, current supplying contacts adapted to pass heating current across the joint between the rivet shank and the walls of the perforations in the plates to be joined through which the rivet passes and a separate heading die.

8. In an electric riveting apparatus, a current supplying contact on one side of the work adapted to engage the head of the rivet, an annular contact adapted to engage the opposite side of the work around the projecting rivet end and a separate pressure die adapted to engage and head the projecting rivet end.

Signed at New York, in the county of New York and State of New York, this 26th day of October A. D. 1918.

EDMUND JANNEZ von HENKE.

Witnesses:
 W. R. WARNER,
 C. F. TISCHNER.